June 20, 1939.    F. PORSCHE    2,163,131
SPRINGING ARRANGEMENT FOR THE WHEELS OF VEHICLES
Filed Feb. 16, 1934    2 Sheets-Sheet 2

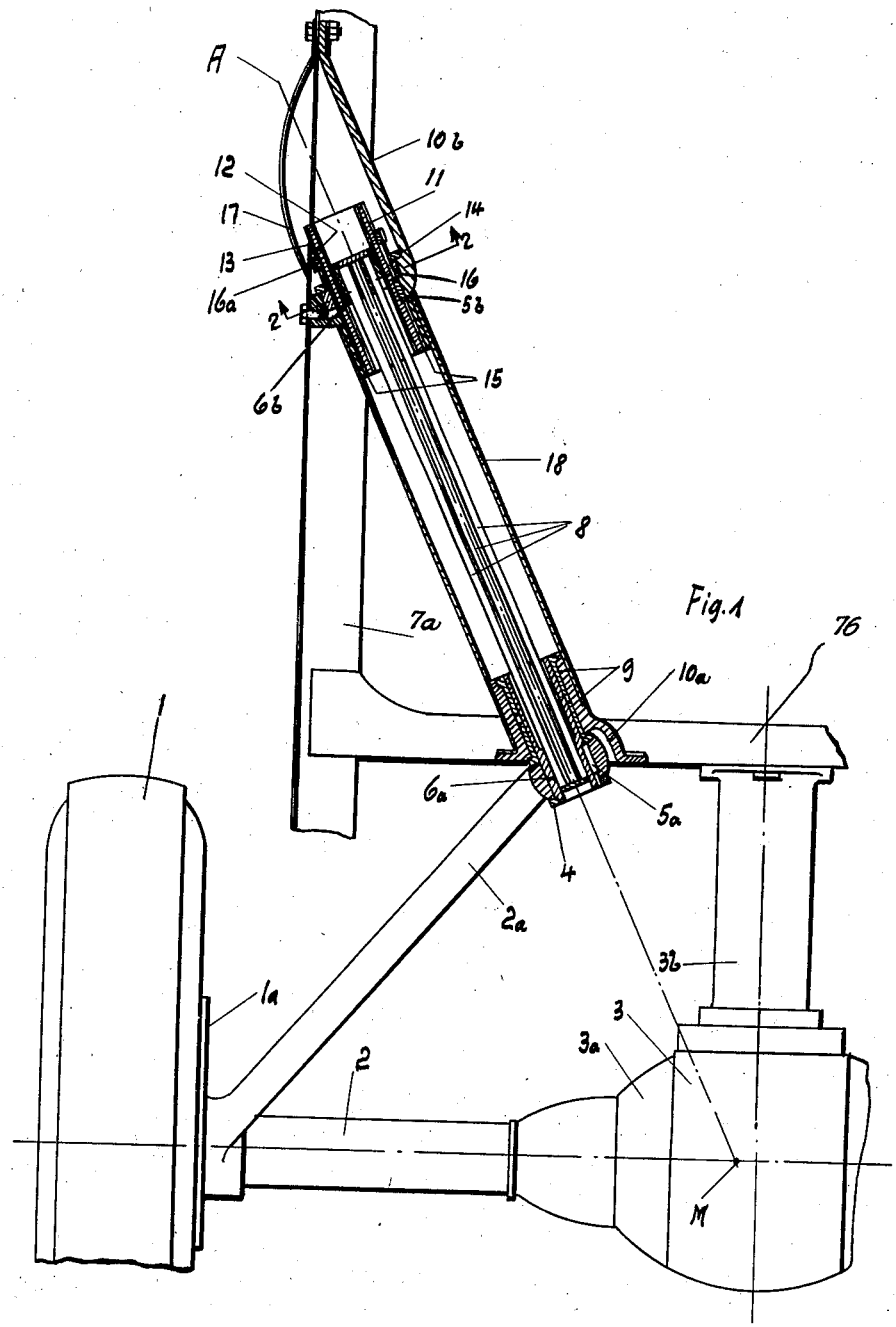

Inventor:
Ferdinand Porsche
by Emil Bönnelycke
Attorney

Patented June 20, 1939

2,163,131

UNITED STATES PATENT OFFICE 2,163,131

SPRINGING ARRANGEMENT FOR THE WHEELS OF VEHICLES

Ferdinand Porsche, Stuttgart, Germany, assignor to Dr. ing. h. c. F. Porsche, K.-G., Stuttgart-Zuffenhausen, Germany, a company of Germany Application February 16, 1934, Serial No 711,576
In Germany February 18, 1933

21 Claims. (Cl. 267—57)

This invention relates to a springing arrangement of wheels mounted on swinging half axles, more particularly for power-driven vehicles, using torsion springs. For regulating the tension of torsion springs it has already been proposed to displace one end of the spring with respect to the other by moving it in the securing grooves, the desired fine adjustment being made possible, more particularly by different groove pitches at the ends of the spring and simultaneous displacing of both ends. In this case it is necessary to free the torsion springs completely from load by raising the vehicle in order that they may be drawn out of the securing grooves in an unstressed state and brought again into engagement therewith. This readjusting device is thus only useful for wheel guides which allow of the wheels springing to such an extent as to unload the torsion springs completely, and must consequently be dispensed with in all wheel suspensions in which for constructional reasons there is still a considerable spring tension at the maximum downward displacement of the wheel. Wheel suspensions of this last type include especially the swinging half axles in which the driving shafts mounted in the axle tube are connected with the axle gearing through a single universal joint. The maximum angular deflection of this universal joint is extremely limited for constructional reasons and therefore, as a rule, is made too small to enable the half axles to swing sufficiently far to unload the springs completely with the necessary high specific springing. For this reason, the swinging of the wheels is limited by fixed stops on the frame which lie within the end positions of the half axles determined by the universal joint. When the vehicle is lifted, the wheel is therefore intercepted by the lower stop so that the torsion springs cannot be unloaded and therefore cannot be displaced in their securing grooves.

The novelty of the invention consists in this, that the tension of the torsion spring can be regulated by means of an adjusting device, an adjusting gear or the like, which is preferably connected with the free end of the spring which acts as abutment. This gives the result that the tension can be adjusted continuously within any desired limits with the torsion spring fully loaded, that is, without unloading the vehicle wheel. In this way, not only is the time required for readjusting the torsion spring greatly diminished, but also it is possible constantly to check the spring tension obtained by observing the position of the vehicle, while the latter can conveniently be adapted to the load of the vehicle. The torsion springs themselves no longer need to be taken out of their bearings but can remain in their original position since the adjusting device or gearing produce positively the relative rotation of the ends of the springs. If this adjusting device engages the free, that is the accessible, end of the spring, it also acts as an abutment for the torsion spring and enables the reaction forces to be transmitted directly for the frame. As this device in this arrangement can be placed at a considerable distance from the part of the axle connected with the torsion spring, neither the accessibility and construction of this part of the axle nor that of the adjusting device is in the least affected. The adjusting device may preferably be operated by simple tools, for example by a screw driver or the like in a very convenient manner. The adjusting device can also be made as self-checking so that any further securing members for the free end of the spring are unnecessary.

The invention is illustrated in a constructional example as applied to swinging half axles, the struts of which are connected with torsion springs lying in the theoretical swinging axis of the wheel, for the rear wheels of a power-driven vehicle.

Fig. 1 is a horizontal section through the mounting of the torsion spring in the left hand side of the vehicle.

Figure 4:
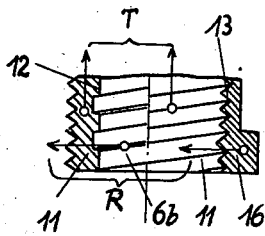
Fig. 4 is a detail of Fig. 3 on the same scale.
Figure 3:
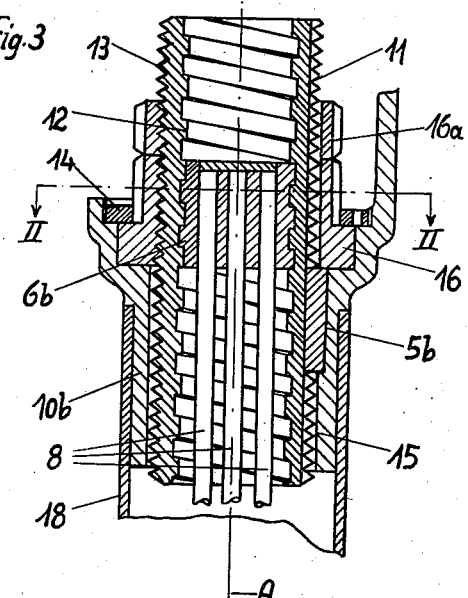
Fig. 3 is a section on the line III—III of Fig. 2.
Figure 2:
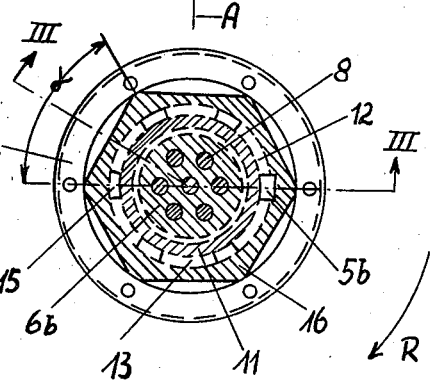
Fig. 2 is a section on the lines II—II of Fig. 1 on a larger scale.

The axle tube 2 connected with the wheel 1 is mounted in a spherical shell secured by the cover 3a in the axle casing 3. The axle casing 3 is mounted in the transverse part 7b of the frame consisting of two parallel longitudinal members 7a, by means of the tubular extension 3b. A strut 2a extending obliquely inwards and forwards is connected with the brake carrying plate 1a of the wheel 1. The nave-like end of the strut 2a is connected, through the intermediary of the key 5a and the nut 4, with a hollow bearing pin or sleeve 6a which, in turn, is affixed on one end of a torsion spring formed from seven bars 8. The axis of the hollow bearing pin 6a passes through the middle point M of the ball guide in the axle casing 3 and forms the theoretical swinging axis A of the wheel 1. The torsion spring lies in this theoretical swinging axis A between the frame members 7a, 7b. The hollow bearing pin 6a is mounted by means of the bushing 9 in a supporting casing 10a secured on the transverse member 7b. The front end of the torsion spring is formed as a spindle 6b and is mounted by means of a screw-thread 12 having a large lead in a sleeve 11 which is axially slidably mounted in a casing 10b secured on the longitudinal member 7a. The lead or pitch of the screw-thread 12 is such that upon axial movement of the sleeve 11 the spindle 6b will be rotated. To prevent rotation between the sleeve 11 and the casing 10b, the outer surface of the sleeve is splined or provided with a plurality of longitudinally extending grooves 15 with which cooperates a key 5b fixed to the interior surface of the casing 10b. With this construction, the sleeve 11 may be moved axially through the casing 10b, but is prevented from rotating therein. A plurality of grooves 15 is provided to enable angular adjustment of the sleeve 11 in the casing 10b. To provide for axial movement of the sleeve 11, its exterior surface is provided with a thread 13 having a small lead or pitch. Cooperating with the external thread 13 is a nut 16 which is secured against movement in a direction axially of the sleeve by the annular plate 14 and a shoulder provided within the casing 10b. Since the nut 16 is secured against axial movement, it will be realized that upon rotating the same the sleeve 11 by reason of the screw-thread 13 will be moved axially and this axial movement by means of the screw-thread 12 having a large lead will cause the spindle 6b to rotate and thereby torsionally affect the spring 8. To prevent accidental rotation of the nut 16 on the sleeve 11, a lock nut 16a is provided. The casing 10b, which is accessible from the vehicle side, is closed by means of a cover 17. The bars 8 are pressed into the end of the hollow pin 6a or the spindle 6b, and, for example, welded directly therewith. The bars 8 are enclosed in a tube 18 which connects the two casings 10a, 10b together and serves as a corner reinforcement of the frame 7a, 7b.

The regulation of the spring tension is effected in the following manner: If after releasing the lock nut 16a the nut 16 is turned by means of a suitable key in the direction of the arrow R (to the right), the sleeve 11 which is prevented from rotating by the key 5b will be displaced outwardly in the direction of the arrow T if the thread 13, as shown in the right hand side of Fig. 4, is right handed. A longitudinal displacement of the sleeve 11 is only possible when at the same time the end member 6b, which is prevented from being longitudinally displaced is also turned in the direction of the arrow R. This is the case when the flat thread 12 shown on the left hand side of Fig. 4 is also right handed. Since the bearing moment $m$ acting on the torsion spring acts in the opposite direction to that in which the end member 6b is rotated, the turning of the end member 6b in the direction of the arrow R results in an additional tensioning of the torsion spring, it is clear that when this operation is reversed the arrows R, T will also be reversed and the torsion spring will be unstressed. When the limit of adjustment for the sleeve 11 is reached, for example after repeated readjustments, the sleeve must be moved in the bearing casing 10b. For this purpose the torsion spring is unloaded by raising the end of the vehicle by an amount corresponding to the angle of rotation $\alpha$. The nut 16 is then turned until the sleeve 11, which moves outwards, comes out of engagement with the key 5b. Then the sleeve 11 is displaced by the angular interval $\alpha$ of the wedge grooves 15 and the nut 16 is finally rotated in the opposite direction until the sleeve 11 moving inwards comes into engagement again with the key 5b by means of its next groove 15. It is advisable to choose the pitch of the screw thread 12 so that the range of adjustment of the sleeve 11 approximately corresponds to the angular interval $\alpha$ of the grooves 15. If, for example, the torsion spring has to be taken down, the sleeve 11 is moved outwards by means of the nut 16 after removing the lock nut 4, whereby the torsion spring grips its spindle 6b by means of the friction fastening and can be drawn out from this together with the pivot pin 6a. It is thus not necessary to take down the bearing casings 10a, 10b or the sleeve axles 2, 2a.

The invention is not restricted to this constructional example. With the arrangement of the torsion springs in the frame that of the adjusting gear can naturally change and it is necessary to consider the desired accessibility thereof for suitable operating tools and also the possibility of removing the torsion spring itself.

It is accordingly to be understood that this invention is not limited to the precise construction and arrangement hereinbefore described but only as may be required by the claims which follow.

What I claim is:

1. In a vehicle having a chassis including a frame, a drive shaft housing connected thereto, a wheel axle, means for pivotally connecting said axle to said housing, a strut attached to said axle adjacent the wheel-carrying end, means for pivotally attaching the free end of said strut to said frame whereby said wheel axle is confined to pivotal movement relative to the frame and drive shaft housing about a substantially horizontal axis, means positioned in alignment with said axis for torsionally resisting movement of said axle about said axis, and means adjustable while the aforesaid means is under load for varying the torsional resistance of the aforesaid means.

2. In a vehicle having a chassis including a frame, a drive shaft housing connected thereto, a wheel axle capable of suspensory swinging through a limited angle, means for pivotally connecting said axle to said housing, a strut attached to said axle adjacent the wheel-carrying end, a journal connected to the free end of said strut, means on said frame for supporting the journal for rotational movement about a substantially horizontal axis in alignment with the pivotal connection between said axle and housing, a torsion spring mounted in alignment with said axis for resisting the rotational movement of said journal and means adjustable while the spring is under load for varying its torsional resistance.

3. In a vehicle having a chassis including a frame, a drive shaft housing, a wheel axle capable of suspensory swinging through a limited angle, means for pivotally connecting said axle to said drive shaft housing, a strut having one end fixed to the wheel-carrying end of said axle and the other end connected to a substantially horizontal shaft rotatably mounted in the frame and whereof the axis intersects that of the drive shaft housing at a point horizontally spaced from the point of attachment of said axle to the strut, a torsion spring fixed between said horizontal shaft and said frame in alignment with said axis for resisting swinging of said axle relative to said drive shaft housing, and means adjustable while the spring is under load for varying its torsional resistance.

4. In a vehicle having a chassis including a frame, a drive shaft housing connected thereto, a wheel axle capable of swinging through a limited angle, means for pivotally connecting said axle to said housing, a strut attached to said axle adjacent the wheel-carrying end, a journal connected to the free end of said strut, means on said frame for supporting the journal for rotational movement about a substantially horizontal axis in alignment with the pivotal connection between said axle and housing, a torsion spring mounted in alignment with said axis for resisting the rotational movement, said spring having one end affixed to said strut and the other end connected to said frame at a point more remote than its first end from the attachment of the strut to the axle, and means adjustable while the spring is under load for varying its torsional resistance.

5. In a vehicle having a chassis including a frame, a drive shaft housing connected thereto, a wheel axle, means for pivotally connecting said axle to said housing, a strut attached to said axle adjacent the wheel-carrying end, means for attaching the free end of said strut to said frame for pivotal movement about a substantially horizontal axis, means positioned in alignment with said axis for torsionally resisting movement of said axle about said axis, means for affixing one end of said spring to the free end of said strut, and anchoring means for the other end of said spring, said anchoring means being adjustable in the chassis while the spring is under load to vary its torsional resistance.

6. In a vehicle having a chassis including a frame, a drive shaft housing connected thereto, a wheel axle, means for pivotally connecting said axle to said housing, a strut attached at one end to said axle adjacent the wheel-carrying end, a journal connected to the other end of said strut, means on said frame for supporting the journal for rotational movement about a substantially horizontal axis in alignment with the pivotal connection between said axle and housing, a torsion spring mounted in alignment with said axis for resisting said rotational movement of the journal, means for affixing one end of said spring to said journal, and means securing the other end of said spring to said chassis said means being adjustable while the spring is under load to vary its torsional resistance.

7. In a vehicle having a chassis including a frame, a drive shaft housing connected thereto and a wheel axle capable of swinging through a limited angle, means for pivotally connecting said axle to said housing, a strut attached at one end to said axle adjacent the wheel-carrying end, a journal connected to the other end of said strut, means on said frame for supporting the journal for rotational movement about a substantially horizontal axis in alignment with the pivotal connection between said axle and housing, a torsion spring mounted in alignment with said axis for resisting said rotational movement of the journal, said spring having one end affixed to said strut and the other end extending farther away from the point of attachment of said axle to said drive shaft housing, and means securing the other end of said spring to said chassis, said means being adjustable while the spring is under load to vary its torsional resistance.

8. In a vehicle having a chassis, a wheel axle, means for pivotally connecting said axle to said chassis to provide for independent swinging of said axle relative to the chassis about a substantially horizontal axis, a torsion spring positioned substantially in said axis, means for affixing one end of said spring to the axle, a spindle fixedly associated with the other end of said spring, said spindle having a screw-thread formed on the surface thereof, a sleeve nut engaging said spindle, and means for axially moving said sleeve nut to rotate said spindle and thereby vary the torsional resistance of said spring.

9. In a vehicle having a chassis, a wheel axle, means for pivotally connecting said axle to said chassis to provide for independent swinging of said axle relative to the chassis about a substantially horizontal axis, a torsion spring positioned substantially in said axis, means for affixing one end of said spring to the axle, a spindle fixedly associated with the other end of said spring, said spindle having a screw-thread formed on the surface thereof, a sleeve nut engaging said spindle, a casing for said sleeve nut mounted on said chassis, means for preventing relative rotation between said sleeve nut and casing, and means for axially moving said sleeve nut to rotate said spindle and thereby vary the torsional resistance of said spring.

10. In a vehicle having a chassis, a wheel axle, means for pivotally connecting said axle to said chassis to provide for independent swinging of said axle relative to the chassis about a substantially horizontal axis, a torsion spring positioned substantially in said axis, means for affixing one end of said spring to the axle, a spindle fixedly associated with the other end of said spring, said spindle having a screw-thread formed on the surface thereof, a sleeve nut engaging said spindle, a casing for said sleeve nut mounted on said chassis, said sleeve nut having axially extending circumferentially spaced grooves formed on the outer surface thereof, means carried by said casing and cooperating with said grooves for preventing rotation between said sleeve nut and casing, and means for axially moving said sleeve nut to rotate said spindle and thereby vary the torsional resistance of said spring.

11. In a vehicle having a chassis, a wheel axle, means for pivotally connecting said axle to said chassis to provide for independent swinging of said axle relative to the chassis about a substantially horizontal axis, a torsion spring positioned substantially in said axis, means for affixing one end of said spring to the axle, a spindle fixedly associated with the other end of said spring, said spindle having a screw-thread formed on the surface thereof, a sleeve nut engaging said spindle and having external screw threads, a casing for said sleeve nut mounted on said chassis, said sleeve nut having axially extending circumferentially spaced grooves formed on the outer surface thereof, means carried by said casing and cooperating with said grooves for preventing rotation between said sleeve nut and casing, and means engaging the external threads of the sleeve nut for effecting axial movement thereof to thereby rotate the spindle.

12. In a vehicle having a chassis including a frame and a drive shaft housing connected thereto and a wheel axle capable of swinging through a limited angle, means for pivotally connecting said axle to said housing, a strut attached to said axle adjacent the wheel-carrying end, a journal connected to the strut, means on said frame for supporting the journal for rotational movement about a substantially horizontal axis in alignment with the pivotal connection between said axle and housing, a torsion spring mounted in alignment with said axis for resisting said rotational movement, means for affixing one end of said spring to said journal, a spindle carried by the other end, said spindle having a screw-thread formed on the surface thereof, a sleeve nut engaging said spindle, and means for axially moving said sleeve nut to rotate said spindle and thereby vary the torsional resistance of said spring.

13. In a vehicle, a frame comprising a generally longitudinally extending side member, a road wheel, an axle therefor, means for attaching said axle to said frame for oscillation about an axis which is generally horizontal and passes near said side frame member, a torsion spring attached at one end to said axle and supported at the other end upon said frame, and means for adjusting the torsion spring relative to said frame, said adjusting means being accessible from the side of the vehicle.

14. In a vehicle, a frame comprising a generally longitudinally extending side member, a road wheel, an axle therefor, means for attaching said axle to said frame for oscillation about an axis which is generally horizontal and intersects said side frame member, a torsion spring attached at one end to said axle and supported at the other end upon said frame, and means for adjusting the torsion spring relative to said frame, said adjusting means being accessible through an opening in the said side member.

15. In a vehicle, a body, a frame comprising a generally longitudinally extending side member located near the side of the body, a road wheel, an axle therefor, means for attaching said axle to said frame for oscillation about an axis which is generally horizontal and passes near said side frame member, a torsion spring attached at one end to said axle, the other end being near said frame, and supported at the other end upon said frame, and means for adjusting the torsion spring relative to said frame, said adjusting means being accessible from the side of the vehicle.

16. In a vehicle, a frame comprising a generally longitudinally extending side member, a road wheel, an axle therefor, means for attaching said axle to said frame for oscillation about an axis which is generally horizontal and intersects said side frame member, a torsion spring attached at one end to said axle, the other end being located in an opening in said frame and supported by said frame, and means for adjusting the torsion spring relative to said frame, said adjusting means being accessible from the side of the vehicle.

17. In a vehicle, a frame comprising a generally longitudinally extending side member, a road wheel, an axle therefor, means for attaching said axle to said frame for oscillation about an axis which is generally horizontal and extends forwardly and outwardly and intersects said side frame member, a torsion spring attached at one end to said axle the other end being located in an opening in said frame and supported thereby, and means for adjusting the torsion spring relative to said frame, said adjusting means being accessible from the side of the vehicle.

18. In a motor vehicle including a frame and a wheel, the combination of a spring suspension means connecting said frame and wheel comprising a torsionally yieldable member, means for adjustably fixing one end of said member in rotationally adjusted position relative to said frame, bearing means on said frame for journaling said yieldable member at a point remote from the adjustably fixed end thereof, and an arm arranged substantially normal to the yieldable member and fixed at one end to the latter, the other end of said arm being rotatably connected to said wheel.

19. In a motor vehicle including a frame and a wheel, the combination of a spring suspension means connecting said frame and wheel comprising a torsionally yieldable member, bearing means on said frame for journaling said yieldable member at a point intermediate its ends, an arm arranged substantially normal to the yieldable member and fixed at one end to the latter, the other end of said arm being rotatably connected to said wheel, and means for adjustably connecting one end of said yieldable member in rotationally adjusted position relative to said frame to maintain the angular position of said arm relative to said frame substantially constant for different loads on said frame.

20. In a motor vehicle including a frame, wheels for said vehicle, means for individually and independently supporting at least one of said wheels for swinging movement relative to said frame, including spring suspension means connecting said frame and wheel comprising a torsionally yieldable member, means for adjustably fixing one end of said member in rotationally adjusted position relative to said frame, bearing means on said frame for journaling said yieldable member at a point remote from the adjustably fixed end thereof, and an arm arranged substantially normal to the yieldable member and fixed at one end to the latter, the other end of said arm being rotatably connected to said wheel.

21. In a motor vehicle including a frame, wheels for said vehicle, means for individually and independently supporting at least one of said wheels for swinging movement relative to said frame about a substantially fixed axis, including spring suspension means, co-axial with said axis of swing, connecting said frame and wheel, comprising a torsionally yieldable member, means for adjustably fixing one end of said member in rotationally adjusted position relative to said frame, bearing means on said frame for journaling said yieldable member at a point remote from the adjustably fixed end thereof, and an arm arranged substantially normal to the yieldable member and fixed at one end to the latter, the other end of said arm being rotatably connected to said wheel.

FERDINAND PORSCHE.